Patented Oct. 26, 1937

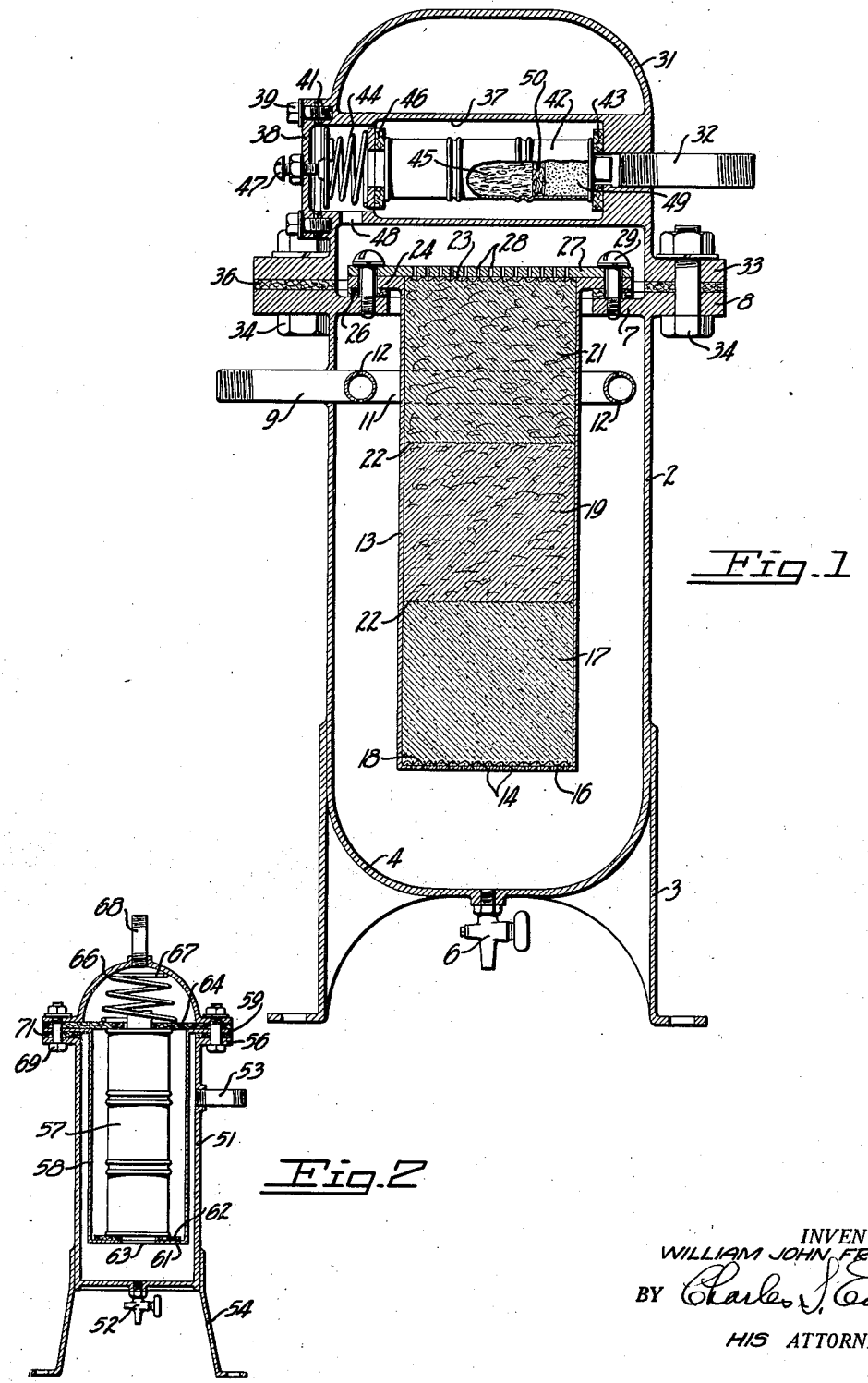

2,096,851

UNITED STATES PATENT OFFICE 2,096,851

AIR PURIFIER

William John Fricke, San Francisco, Calif., assignor, by mesne assignments, to E. D. Bullard Company, San Francisco, Calif., a corporation of California Application June 13, 1934, Serial No. 730,401

4 Claims. (Cl. 183—48)

My invention relates to an air purifier, and more particularly to a compressed air purifier.

The broad object of my invention is to provide means for removing undesirable and harmful constituents from compressed air which is being supplied for breathing purposes.

Another object of my invention is to provide a purifier which will also cool the compressed air.

A more specific object of my invention is to provide a purifier which will remove the moisture from the air.

Another object of my invention is to provide a purifier which will remove oil from the air.

Another object of my invention is to provide a purifier which will also clear the air of particles of foreign material, such as dust and bacteria.

Still another object of my invention is to provide means, preferably attached as an auxiliary unit, for removing noxious gases, such as acid fumes, carbon monoxide or ammonia.

A further object of my invention is to provide an improved composition and arrangement of filtering materials.

A still further object of my invention is to provide means for increasing the life of the filtering materials.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a vertical sectional view of a purifier embodying the improvements of my invention; and Figure 2 is a similar view showing a variant form of construction.

In terms of broad inclusion, the air purifier embodying my invention comprises a chamber in which the air may expand, and a filter through which the expanded air may pass. The expansion in the chamber performs the double function of cooling the air and condensing out the major portion of the water. The filter contains a material for removing oil, and also a filtering material for removing the last traces of moisture. A material is also preferably provided in the filter for removing entrained particles, such as dust and bacteria. In the preferred construction the filter is replaceably mounted within the expansion chamber to provide a compact unit; suitable means being provided for introducing the air into the expansion chamber and for draining the latter of collected fluids. Means are also preferably provided, preferably as an auxiliary unit to the purifier, for removing noxious gases from the air.

In greater detail, and referring particularly to Figure 1, the air purifier embodying my invention comprises an outer and preferably cylindrically-shaped casing 2 supported in upright position by suitable legs 3. The casing 2 provides the expansion chamber of my purifier, and is formed with a bell-shaped bottom 4 having a drain cock 6 by which collected fluids may be removed. An annular plate is provided on the upper end of the expansion chamber and projects inwardly to provide an internal flange 7 and also projects outwardly to provide an external flange 8.

Means are provided for introducing the compressed air to be purified into the expansion chamber 2. For this purpose an inlet duct 9 is arranged to project into the expansion chamber adjacent its upper end, and carries an annular duct 11 having a plurality of discharge apertures 12 to provide a distributing head. The total area of the discharge orifices 12 is preferably less than the cross sectional area of the purifier outlet, so that the air is expanded in the expansion chamber. As the air expands in the chamber 2 two important results are secured. In the first place, the air is cooled by the expansion. This cooling of the warm compressed air is desirable since it is to be used for breathing purposes. The second important result of the expansion process is that the major portion of the water is condensed out. The condensed water collects in the bottom of the expansion chamber, and may be drained out at intervals through the cock 6.

Filter means are provided for removing other undesirable constituents from the air. This filter preferably comprises a cylindrical container or chamber 13 suspended at its upper end and arranged to project downwardly into the expansion chamber. This mounting of the filter within the expansion chamber provides a compact purifier construction. The inner chamber 13 extends through the distributing head 11 and is spaced from both the side and bottom walls of the expansion chamber. Suitable apertures 14 are provided in the bottom wall 16 of the inner chamber through which air may pass from the expansion chamber into the filter unit.

As the expansion takes place in the upper end of the chamber between the cylinders 2 and 13 the expanding air impinges against these surfaces. The condensed moisture collects on the exposed surfaces, and as the droplets grow in size they move downwardly along with the air current. The major portion of the moisture in the air is removed by this expansion and condensation process. As the expanding air impinges against the exposed metallic surfaces a certain amount of the oil entrained in the air is also collected on the surfaces. Any small droplets of oil held suspended in the air are separated out in this way. The oil collected on the surfaces of the cylinders 2 and 13 ultimately works downwardly with the condensed water and collects in the bottom of the expansion chamber.

The filter unit 13 is packed with a plurality of layers of filtering materials. The first or bottom layer 17 preferably comprises a material for removing the remaining oil in the air. Any suitable oil absorbing material, such as charcoal, may be employed. I prefer to use the activated charcoal which is ordinarily used as an oil filtering medium. This activated charcoal is packed in the bottom of the filter unit 13 on a suitable retaining screen 18. The arrangement of the charcoal layer in the bottom of the filter unit is to be especially noted, since this arrangement extracts all of the oil before the air passes through the remaining filtering material in the filter unit 13.

The second or intermediate layer 19 in the filter unit comprises a material for removing the last traces of water from the air. Any suitable material, such as sawdust, may be used for this purpose. I prefer to use shredded redwood bark however because of its exceptionally good water absorptive properties. As the air passes through the layer 19 the last traces of moisture are removed. It is to be noted that this layer is not subjected to the deteriorating influences of oil, since the latter was completely removed in the underlying charcoal layer 17. This arrangement materially increases the useful life of the redwood bark for its intended purpose of absorbing moisture.

The third or upper layer 21 preferably comprises a material for filtering out particles of foreign material, such as dust and bacteria. Any suitable material, such as cotton, may be used for this purpose. I have found that a soft wool felt functions as an excellent filtering material for the purpose desired, and prefer to use the latter material. Such materials lose their filtering value and soon deteriorate if exposed to moisture, and it is to be specially noted that the arrangement of the materials in the filter is such that all the oil and moisture has been removed prior to the air reaching the layer 21.

The several layers in the filter 13 are preferably separated by sheets 22 of a suitable material, such as gauze. The upper layer 21 is also preferably covered by a screen 23 similar to that employed under the bottom layer 17. The three layers 17, 19 and 21 in the filter 13 are preferably of equal size. The amount of filtering material used of course depends upon the size of the purifier unit. In a large purifier, supplying a minimum of 125 cubic feet of air per minute, I have used layers having a cross sectional area of about 63 square inches and a heighth of about 13 inches with good results.

Means are provided for detachably mounting the filter unit 13 so that the latter may be taken out for replacement. To this end a flange 24 is provided about the upper open end of the filter chamber 13, adapted to overlie the inwardly extending flange 7 of the expansion chamber. A suitable gasket 26 is preferably interposed between these flanges to provide an airtight seal. The upper end of the filter chamber is closed by a cover plate 27 overlying the flange 24 and having a plurality of apertures 28 by which the air may leave the purifier. The whole assembly is secured by suitable screws 29.

A suitable head 31 is provided on the upper end of the expansion chamber, and is hollowed out to receive the air from the filter unit 13 and conduct the same to an outlet duct 32 provided on the head. The head 31 is provided with a flange 33 overlying the expansion chamber flange 8, and the head is clamped down by suitable bolts 34 passing through the flanges. A gasket 36 is provided for sealing these elements. The head 31 may be a plain hollow head for leading the air from the purifier unit to the outlet duct 32, or it can embody auxiliary purifying means as illustrated in Figure 1.

The auxiliary purifier is used when the air is to be additionally treated for noxious gases. In the construction of the head a recess or bore 37 is provided with one end opening out on the side of the head and the other end communicating with the outlet duct 32. The open end of this bore is closed by a cover plate 38 secured to the head by screws 39 and sealed by a suitable gasket 41. A canister 42 is removably positioned in the recess 37 with one end resting against a gasket 43 in the base of the recess and with the other end supported by a spring 44 bearing on the canister against a gasket 46.

The supporting or positioning spring 44 is held between the canister and the cover plate 38 and is adjustably compressed by an adjusting screw 47 threaded in the plate. This adjustable spring provides means for insuring a tight seal between the canister and the head, and also provides a degree of flexibility whereby different sized canisters may be incorporated in the head. A passage 48 leading from the lower hollow portion of the head into the recess 37 provides communication between the upper end of the filter unit 13 and the outer open end of the canister 42. By this arrangement the course of the air is directed through the canister before reaching the outlet duct 32.

The filtering material employed in the canister 42 depends upon the type of gas to be removed. If acid gases are to be contended with the filtering material used is preferably soda-lime. For carbon monoxide the cartridge or canister 42 is preferably filled with redwood bark saturated with a five per cent solution of nickel chlorite. When ammonia gases are encountered a filtering material comprising a fibrous material treated with an acid is preferably used. In connection with the latter filtering material I prefer to place a layer of soda-lime in the forward end of the canister 42, preferably separated from the acid treated fiber by a felt pad. The soda-lime removes any undesirable acid fumes which might be given off by the filtering material. This arrangement is illustrated in Figure 1, in which a portion of the canister is broken away to show the acid treated fibrous layer 45 separated from the layer 49 of soda-lime by a felt pad 50.

Since the type of filtering materials in the canister unit 42 requires relative frequent replacement, the separate mounting of this unit in the manner described is especially important. In my construction the cartridge or canister 42 may be replaced by merely removing the cover plate 38, and without disturbing the head mounting or the main filter unit 13. Another important reason for mounting the canister 42 in the head 31 is that this unit may be provided as an auxiliary unit. The need for removing noxious gases is usually the exception and not the rule. With my purifier construction the main filter unit 13 is a part of the permanent construction, with which a plain head or one embodying the canister 42 may be optionally employed.

A variant embodiment of my invention is shown in Figure 2. This construction is especially designed as a small unit for use in conjunction with gas masks being supplied with compressed air. In this embodiment a cylindrical expansion chamber 51 is provided having a drain cock 52 in its bottom and an inlet duct 53 threaded into its upper side wall. Suitable supports 54 are provided, and an outwardly extending flange 56 is formed about the upper open end of the chamber.

The filter unit in this construction comprises a canister 57 supported in an inner cylinder 58 having an upper flange 59 overlying the flange 56 of the outer cylinder. The canister rests on the bottom 61 of the inner cylinder on a suitable gasket 62. An aperture 63 in the bottom 61 provides a passage to open communication between the expansion chamber and the canister.

The canister is held rigidly by a gasket 64 overlying the inner cylinder flange 59 and extending inwardly to overlie the rim of the canister. A bell-shaped head 66 is provided over the upper gasket 64, and a spring 67 is compressed between this head and the latter gasket to hold the gasket tightly down on the rim of the canister. An outlet duct 68 having a bore greater than that of the inlet duct 53 is provided in the head, and the whole assembly is secured together by bolts 69 passing through the flanges of the several elements; a suitable gasket 71 being also provided between the cylinder flanges 56 and 59 to effect a seal between these elements. An important feature in this construction is that the several component parts are all assembled together and held by the single series of flange bolts 69.

The filtering materials provided in the canister or filter 57 are preferably similar to those provided in the filter 13 of the construction shown in Figure 1. In other words, a layer of activated charcoal is placed in the bottom of the canister, then a layer of redwood bark is provided to overlie the charcoal layer, and then a layer of wool felt is provided to overlie the redwood layer. By this construction and arrangement the three undesirable constituents usually encountered are removed, namely oil, moisture and foreign particles. Of course it is understood that the replaceable canister 57 could be provided with an extra top layer of a suitable filtering material for removing noxious gases. This extra layer would then perform the function of the auxiliary canister unit in the construction shown in Figure 1.

In conclusion it is pointed out that the positional relationship of the various elements is an important feature of my improved purifier construction. By reason of the sequence in which the air is acted upon, the useful life of the various materials in the purifier unit is materially prolonged. The expansion of the air prior to passing through the filter unit initially removes the major portion of the moisture. Since the water content is ordinarily the largest constituent to be taken care of, this preliminary dewatering operation relieves the filter of this burden, and since the water absorbing layer 19 of the filter only has to take care of a small moisture content the active life of this layer, and consequently the filter unit as a whole, is materially enhanced. The removal of the oil prior to the air entering the layers 19 and 21 protects the latter materials.

If the oil were not first removed the type of materials needed in the layers 19 and 21 would soon become gummed up. Furthermore, the removal of all moisture prior to the air reaching the upper layer 21 prevents the latter from being water saturated. If the layer 21 were allowed to become wet its efficacy as a filter for solid particles would be materially reduced. The arrangement of the elements therefore all contribute to securing the maximum life from the filtering materials. I have found that the main filter unit in my purifier requires renewal but once in every ten to twelve months.

I claim:

1. A purifier for compressed air comprising a cylindrical expansion chamber, a second cylindrical chamber projecting downwardly into the expansion chamber and spaced from the side and bottom walls of the latter chamber, said inner chamber having an opening communicating with the expansion chamber, a filtering material in the inner chamber, means for introducing the compressed air into the expansion chamber, a head over said chambers, a cylinder extending across the head and opening out at one side thereof to provide a recess, an outlet duct leading from the inner end of said recess, a canister removably mounted in the recess and communicating at one end with said duct, a cover plate for closing the recess, said head having a passage communicating between the other end of the canister and the inner cylinder, and a filtering material in the canister.

2. A purifier for compressed air comprising a cylindrical expansion chamber, a second cylindrical chamber projecting downwardly into the expansion chamber and spaced from the side and bottom walls of the latter chamber, said inner chamber having an opening communicating with the expansion chamber, a filtering material in the inner chamber, means for introducing the compressed air into the expansion chamber, a head over said chambers, a cylinder extending across the head and opening out at one side thereof to provide a recess, an outlet duct leading from the inner end of said recess, a canister removably mounted in the recess and communicating at one end with said duct, a cover plate for closing the recess, a spring interposed between the cover plate and canister, said head having a passage communicating between the other end of the canister and the inner cylinder, and a filtering material in the canister.

3. An air purifier comprising an expansion chamber, a hollow head mounted on and ported into the expansion chamber, a primary filter mounted in the expansion chamber and connected across the port between said chamber and head, a canister removably positioned in the head, and a spring interposed between the head and canister for holding the latter in place.

4. A purifier for compressed air comprising a cylindrical expansion chamber, a second cylindrical chamber projecting downwardly into the expansion chamber and spaced from the side and bottom walls of the latter chamber, said inner chamber having an opening communicating with the expansion chamber, a filtering material in the inner chamber, means for introducing the compressed air into the expansion chamber, means for securing the inner chamber to the expansion chamber, an apertured plate over the inner chamber and fastened by said securing means, a hollow head over the chambers and communicating with the inner chamber, and means separate from said first mentioned securing means for securing the head to the expansion chamber.

WILLIAM JOHN FRICKE.